United States Patent
Otten et al.

(10) Patent No.: US 6,537,634 B2
(45) Date of Patent: *Mar. 25, 2003

(54) ADHESIVE SECURITY TAPE FOR DETECTING UNAUTHORIZED BROACHING OF A PACKAGE

(75) Inventors: Ulrich Otten, Hamburg (DE); Dieter Wenninger, Hamburg (DE); Stefan Röber, Hamburg (DE); Thomas Scheubner, Bad Seckingen (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/732,450

(22) Filed: Dec. 6, 2000

(65) Prior Publication Data

US 2001/0007702 A1 Jul. 12, 2001

(30) Foreign Application Priority Data

Dec. 29, 1999 (DE) .......................................... 199 63 712
May 5, 2000 (DE) .......................................... 100 22 002

(51) Int. Cl.⁷ ................................................. B32B 27/06
(52) U.S. Cl. .................... 428/40.1; 428/41.3; 428/41.5; 428/41.6; 428/41.8; 428/42.1; 428/201
(58) Field of Search .............. 428/40.1, 41.3, 428/41.5, 41.6, 41.8, 42.1, 201

(56) References Cited

U.S. PATENT DOCUMENTS

| | | | |
|---|---|---|---|
| 4,121,003 A | 10/1978 | Williams | 428/40 |
| 4,180,929 A | 1/1980 | Schultz, Jr. | 40/2.2 |
| 4,184,701 A | 1/1980 | Franklin et al. | 283/9 |
| 4,721,638 A | 1/1988 | Matsuguchi et al. | 428/40 |
| 4,763,931 A | 8/1988 | Matsuguchi et al. | 283/108 |
| 5,060,848 A | 10/1991 | Ewan | 229/102 |
| 5,153,042 A | 10/1992 | Indrelie | 428/40 |
| 5,633,058 A | 5/1997 | Hoffer et al. | 428/40.1 |
| 5,658,411 A | 8/1997 | Faykish | 156/233 |
| 6,248,427 B1 * | 6/2001 | Ast | 428/203 |

FOREIGN PATENT DOCUMENTS

| | | |
|---|---|---|
| DE | 34 31 239 | 7/1985 |
| DE | 35 34 557 | 4/1986 |
| DE | 35 34 558 | 4/1986 |
| DE | 197 55 793 | 7/1999 |
| DE | 295 05 635 | 9/1999 |
| EP | 0 404 402 | 12/1990 |
| EP | 0 491 099 | 6/1992 |
| EP | 0 651 365 | 5/1995 |
| WO | WO 94/13474 * | 6/1994 |
| WO | 97/44769 | 11/1997 |

OTHER PUBLICATIONS

English translation of Derwent Abstract of DE 298 05 635 (Aug. 5, 1999).
English translation of Derwent Abstract of DE 34 31 239 (Jul. 25, 1985).
English translation of Derwent Abstract of DE 197 55 793 (Jul. 1, 1999).

* cited by examiner

Primary Examiner—Nasser Ahmad
(74) Attorney, Agent, or Firm—Norris, McLaughlin & Marcus, P.A.

(57) ABSTRACT

A multilayer adhesive tape having a backing based on an oriented thermoplastic film, whose upper face is coated, if desired, with a release coating and to whose lower face the following layers have been applied:

a) a primer layer which is not applied over the full area and which anchors very well to the thermoplastic film, b) a release layer which is applied over the full area of the applied primer layer, and the free thermoplastic film surface, the release layer anchoring better to the primer layer than to the thermoplastic film, c) a pressure-sensitive adhesive composition which is applied over the full area of the release layer and which is anchored better on the release layer than the release layer on the thermoplastic film.

13 Claims, 2 Drawing Sheets

ADHESIVE SECURITY TAPE FOR DETECTING UNAUTHORIZED BROACHING OF A PACKAGE

The invention relates to a multilayer adhesive tape having a backing based on an oriented thermoplastic film coated on one side with adhesive composition. The adhesive tape indicates the unauthorized opening of a package by virtue of the fact that, on peeling from the surface to which it is stuck, areas of the adhesive tape are extracted from the adhesive tape and remain on the surface as a message, which is imperceptible prior to detachment from the surface. The message remains visible even if following detachment the adhesive tape is replaced exactly at the original bond site.

BACKGROUND OF THE INVENTION

Protecting goods present in the logistical chain from producer to user has become more difficult owing to the large number of links in this chain. Thus the damage which occurs by theft of the product from its delivery packaging during warehousing and transit has risen to become a significant cost factor. The recipient of a delivery unit in which some of the product has been switched or removed by theft, moreover, has difficulties in proving that this act has not been committed within his or her own sphere of influence.

Significantly greater security against an attempted theft, and reliable evidence that a delivery unit has been opened before its transfer to the next section of the logistics chain, are made possible by an adhesive tape which indicates by means of an irreversible message that it has already been detached from the surface of the delivery unit.

Security systems for detecting unauthorized opening are known and are described in multiplicity in the prior art. Security labels, in particular, are of great importance in this context. For example, U.S. Pat. No. 4,184,701 describes security labels which are constructed from a plurality of color layers or, generally, layers and which as a result exhibit little adhesion of the product layers to one another. In combination with a strongly adhering adhesive composition, such layers separate from one another irreversibly, thereby indicating the broaching of the package.

Furthermore, for example, DE 34 31 239 A1 describes the use of security labels comprising a backing material of low tear propagation resistance. In combination with a strongly adhering adhesive composition, the security label is irreversibly destroyed on removal and thus indicates the attempted broaching.

The security label has a lower, first adhesive layer, intended for detachment from a backing and application to the package, on the bottom face of a first label material to whose top face there is applied, by means of a second adhesive layer, a second label material. The extent of the bond strength of the first adhesive layer between the package and the first label material is different than the extent of the bond strength of the second adhesive layer between the first label material and the second label material.

Adhesive security tapes are commonly designed in such a way that a weakness in anchoring below the colored structure of the adhesive tape is introduced in the region of the writing. For instance, U.S. Pat. No. 5,633,058 describes a transparent printed indicium, anchored weakly to the backing film, which is covered with a full-area colored layer which anchors well to the backing film and to the first print. The colored layer is covered with a self-adhesive composition. When an adhesive security tape of this kind is peeled from a surface, the transparent printed indicium is parted from the film surface, together with the color layer and the adhesive composition, and remains as writing on the surface.

EP 0 491 099 A1 describes a printed indicium comprising a silicone material likewise covered with a colored layer which adheres well to the film. The colored layer is covered with a self-adhesive composition. When an adhesive security tape of this kind is peeled from a surface, the color layer and the adhesive composition detach from the silicone surface and remain as writing on the surface.

The disadvantage of a construction of this kind is the complex process engineering for producing the layers, since partial silicone surfaces greatly hinder further coating, owing to the low surface tension.

U.S. Pat. No. 4,121,003 describes how the transfer of writing is brought about by this writing comprising of a material of low cohesion which, when the adhesive security tape is detached, splits within itself and remains in part on the surface to which it was stuck.

EP 0 404 402 A2 is based on a transparent splittable layer which becomes opaque at the boundary layer which develops, and which therefore offers a previously imperceptible optical contrast surface against which the writing then becomes legible.

A disadvantage of structures of this kind, moreover, is that the surface of delivery units which comprise not very split-resistant material such as paper, for example, are easily torn by the adhesive tape. The split-off surface of the delivery unit tears over its full area beneath the adhesive tape and adheres in such a way that it covers the surface of the adhesive composition. In that case, the writing is not transferred to the surface of the cardboard box, and the message provided does not appear.

This disadvantageous circumstance is addressed by many available adhesive tapes of this kind by virtue of the fact that they possess a weakly adhering adhesive composition which may be peeled off without tearing the paper surface. The disadvantage of this solution, however, is inadequate bonding reliability to the different kinds of paper materials, especially grades with a high waste paper content, so that the U-shaped closure of a delivery case carrying these adhesive tapes is parted again under the pressure of the lid flaps, and the case opens of itself.

A further requirement of security against manipulation is the rapidly and easily visible individuality of the adhesive tape closure. Normal adhesive packaging tapes, therefore, are printed on the reverse of the backing with the individual company logo, so that a switch or overtaping with a different adhesive tape is readily perceptible. The possible print run of adhesive tapes identified in this way is a single roll at minimum, so that a high level of individuality of the delivery of the packages sealed using this adhesive tape may be achieved.

To date there has been no satisfactory success in combining the two security effects of message transfer and individual printing. Subsequent printing on the reverse of the backing of the existing adhesive tapes is impossible using the standard printing techniques, owing to the necessary silicone release on this surface. In the prior art embodiments of such an adhesive tape, therefore, the backing film is printed prior to the provision of the layers necessary for the message transfer effect. A consequence of this is that only large runs of adhesive tapes with an individual print can be produced economically.

Available embodiments of an adhesive security tape in the sense described are printed, as an alternative, with a serial number for the purpose of individualization. This method, however, requires a high level of information exchange within the logistics chain. In addition, it necessitates laborious checking of each delivery unit for agreement with the circle of numbers notified by the producer.

The technical implementation of an adhesive security tape of this kind is very costly in the material and in the production process. For instance, backing films used to date have been those comprising expensive materials such as polyesters and polystyrene. Films based on polystyrene, however, are brittle and do not withstand the impact and drop loads which occur during transport and warehousing of packages sealed with adhesive packaging tapes.

Thermoplastic films based on polyethylene terephthalate (PET) or polyvinyl chloride (PVC) are used by various manufacturers to produce adhesive tapes. Films based on PET, in particular, are notable for a high elongation at break and heat resistance of from 130° C. to 175° C., in addition to resistance to dilute alkalis and acids.

Furthermore, films based on polyesters possess very high abrasion resistance and puncture resistance, but are less widespread in the adhesive packaging tapes sector owing to their relatively high price relative to polyolefin-based films.

Films based on PVC are used, in combination with solventborne adhesive compositions based on natural rubber, by various manufacturers as adhesive packaging tapes. In this case, unplasticized PVC films are used owing to their better heat resistance, which extends up to max. 105° C.

The PVC in this case may be obtained by emulsion, suspension or bulk polymerization. Copolymers based on PVC/vinyl acetate are also known.

Furthermore, the films based on unplasticized PVC are notable for moderate puncture strength and partial resistance to gasoline, oil and alcohols. In general, in the absence of corona treatment, the anchoring of primers to PVC films is better than in the case of other thermoplastic films, such as polyolefin-based films, for example. This is a result of the high surface energy even without pretreatment [approximately 39 dyn/cm] and on the rough surface texture of PVC films. For adequate anchoring of adhesive compositions based on natural rubber, a primer-coated PVC film is advisable.

In the production of adhesive tapes with adhesive compositions based on natural rubber, both water-based and solventborne primers are used as adhesion promoters between adhesive composition and backing film. These adhesion promoters which are used possess in part a crosslinking effect on the adhesive composition based on natural rubber which is applied from solution.

It is an object of the present invention to provide an adhesive security tape which on removal from the surface of a packaging leaves an especially colored layer, within which there is inverse writing. At the same time, the identical writing is visible in positive form on the peeled-off film backing.

This object is achieved by means of an adhesive tape as specified in the main claim. The subclaims relate to advantageous developments of the subject matter of the invention. The invention additionally relates to proposed uses of the adhesive tape of the invention.

SUMMARY OF THE INVENTION

The invention accordingly provides a multilayer adhesive tape having a backing based on an oriented thermoplastic film, whose upper face is coated, if desired, with a release coating and to whose lower face the following layers have been applied:

a primer layer which is not applied over the full area and which anchors very well to the thermoplastic film, a release layer which is applied over the full area of the applied primer layer, and the free thermoplastic film surface, the release layer anchoring better to the primer layer than to the thermoplastic film, a pressure-sensitive adhesive composition which is applied over the full area of the release layer and which is anchored better on the release layer than the release layer on the thermoplastic film.

When the adhesive tape of the invention is removed from the surface of a package, it leaves inverse writing behind on the package by virtue of the fact that the especially colored first release layer separates from the thermoplastic film, while areas which were firmly anchored to the backing surface by means of primer are detached from the surface of the package together with the backing.

The region of the first release layer which was strongly anchored to the film surface by the primer layer remains on the backing surface.

An appropriate gradation of the release forces of the multilayer construction produces reliable separation within the adhesive tape and the splitting of the package surface, especially in the case of cardboard packaging, is avoided by the adhesive composition. The writing may be reliably transferred, in particular, to all standard commercial paper grades for cardboard boxes.

The message is imperceptible prior to the detachment of the adhesive tape from the surface. Following detachment, the message remains perceptible even if the adhesive tape is replaced exactly in the original bond site, so that the evidence of a manipulation of quantitative or qualitative nature remains perceptible on the packaged product.

The adhesive security tape ensures that the message is transferred reliably to a) solid surfaces which are difficult to split, b) surfaces with little splitting resistance, and c) surfaces having antiadhesive properties, as are customary in the case of standard commercial paper grades from waste paper.

Furthermore, the adhesive security tape of the invention is designed in such a way that economic individual printing for a minimum of one roll is possible.

DETAILED DESCRIPTION

In a first advantageous embodiment of the adhesive tape, the thermoplastic film comprises oriented HDPE, PVC, PET, monoaxially oriented polypropylene, or biaxially oriented polypropylene, and in particular is transparent.

Polyester-based films, polyethylene terephthalate for example, may likewise be used to produce the adhesive tapes of the invention.

The thicknesses of the films based on PET are between 20 and 100 $\mu$m, in particular between 30 and 50 $\mu$m.

Films based on oriented polyolefins belong to the prior art. Monoaxially and biaxially oriented films based on polyolefins are used in large amounts for adhesive packaging tapes, strapping tapes, and other adhesive tapes. Also known are films based on oriented polyethylene or oriented copolymers containing ethylene and/or propylene units. All of these listed films may be used as the backing film in accordance with the invention.

Monoaxially oriented polypropylene is notable for its very high tensile strength and low stretching in the longitudinal direction and is used, for example, to produce strapping tapes. For producing the adhesive tapes of the invention for the bundling and palletization of cardboard boxes and other goods, preference is given to monoaxially oriented films based on polypropylene.

The thicknesses of the monoaxially oriented films based on polypropylene are preferably between 25 and 200 μm, in particular between 40 and 130 μm.

Films of monoaxially oriented polypropylene are particularly suitable for producing the adhesive tapes of the invention. Monoaxially oriented films are predominantly single-layer films, although in principle multilayer monoaxially oriented films may also be produced. The known films are predominantly one-, two- and three-layer films, although the number of layers chosen may also be greater.

For the production of the adhesive tapes of the invention for secure carton sealing, preference is given to biaxially oriented films based on polypropylene with a draw ratio in the longitudinal (machine) direction of between 1:4 and 1:9, preferably between 1:4.8 and 1:6, and a draw ratio in the transverse (cross) direction of between 1:4 and 1:9, preferably between 1:4.8 and 1:8.5.

The moduli of elasticity achieved in the longitudinal direction, measured at 10% elongation in accordance with ASTM D882, are usually between 1000 and 4000 $N/mm^2$, preferably between 1500 and 3000 $N/mm^2$.

The thicknesses of the biaxially oriented films based on polypropylene are in particular between 15 and 100 μm, preferably between 20 and 50 μm.

Biaxially oriented films based on polypropylene may be produced by means of blown film extrusion or by means of customary flat film units. Biaxially oriented films are produced both with one layer and with a plurality of layers. In the case of the multilayer films, the thickness and composition of the different layers may also be the same, although different thicknesses and compositions are known.

Particularly preferred for the adhesive tapes of the invention are single-layer, biaxially or monoaxially oriented films and multilayer, biaxial or monoaxial films based on polypropylene which have a sufficiently firm bond between the layers, since delamination of the layers in the course of the application is disadvantageous.

Films based on unplasticized PVC are likewise known and are used by various adhesive tape manufacturers to produce adhesive packaging tapes. Plasticized PVC films are likewise suitable for producing adhesive packaging tapes, although their inadequate heat resistance of max. 60° C. must be taken into account.

For the adhesive tapes of the invention for secure carton sealing it is preferred to use films based on unplasticized PVC. The thicknesses of the films are preferably between 30 and 100 μm, in particular between 35 and 50 μm. The adhesive tapes of the invention are used as packaging tapes for carton sealing.

Release coatings as may be applied to the upper film surface, i.e., to the film surface opposite the adhesive composition, are in widespread use in the adhesive tape industry. An overview of release coating systems based on silicone and their use in the pressure-sensitive adhesives field may be found in "Silicone Release Coating" (D. Jones, Y. A. Peters in Handbook of Pressure Sensitive Adhesive Technology, Third Edition, edited by Donatas Satas, Van Reinhold New York, pp. 652–683).

The use of rear-face release coatings results in easy, uniform unwinding of the adhesive tapes. Used above all in this context are release coatings based on solventborne carbamate systems and on silicone-based systems.

Release coatings based on silicone systems are suitable as release coatings of the adhesive tapes of the invention. Preferred release coatings are UV-curing silicone systems on a 100% basis, although solventborne silicone systems may likewise be used as a release coating for the adhesive tapes of the invention.

The application rate of the release coating on the backing material is preferably from 0.1 to 3 $g/m^2$. In a further, particularly preferred embodiment, the application rate of the release coating layer is set at from 0.2 to 1.5 $g/m^2$.

In order to achieve very good anchoring of the first release layer of the adhesive tape of the invention on specific regions of the film, an adhesion promoter or primer is used as the first layer. In this case, the film surface opposite the release coating is used.

Both solvent- and water-based adhesion promoters are used as adhesion promoters between film and adhesive composition or further layers for the production of adhesive tapes. Layers with high affinity to backings or adhesion to backings based on thermoplastic films are used to produce adhesive tapes. The high affinity to surfaces of backings based on thermoplastic films governs the quality of such components for use as appropriate adhesion promoters. A variety of primer systems is known. Adhesion promoters suitable for use as the first release layer of the adhesive tapes of the invention are, for example, aqueous adhesion promoters based on polyurethanes, polypropylenes with low degrees of chlorination, styrene-butadiene copolymers, and acrylates. Solventborne adhesion promoters are likewise suitable for the anchoring of subsequent layers in the adhesive tapes of the invention. Within the adhesives tape industry, these adhesion promoters are used as primers.

The application rate of the primer layer to the backing material is preferably from 0.5 to 12 $g/m^2$. In a further preferred embodiment, the layer application rate of the first adhesion promoter layer is set at from 1.5 to 6 $g/m^2$.

In one preferred embodiment of the adhesive tape, the adhesion of the primer layer to the polyolefin-based thermoplastic film is improved by means of corona treatment or, especially, by means of flame pretreatment, since the surfaces of films based on oriented polyolefins in particular may be treated by means of these widely known processes, such as corona treatment or flame treatment. Preference is given to surface treatments by means of flame pretreatment. An overview of the techniques for surface treatment is contained, for example, in the article "Surface pretreatment of plastics for adhesive bonding" (A. Kruse; G. Krüger, A. Baalmann and O. D. Hennemann; J. Adhesion Sci. Technol., Vol. 9, No 12, pp 1611–1621 (1995)).

The primer layer is not applied over the whole area of the thermoplastic film-based backing surface opposite the release coating. In order to achieve a visual security effect in the application of the adhesive tapes of the invention, the primer layer is applied in a specific, incomplete manner to the film surface. The application of the primer layer is designed in such a way that only specific regions of the film surface are coated which form, for example, the word "OPENED" or "VOID". This mode of application of the primer layer is made possible by means of appropriate printing processes.

The incompletely applied primer layer on the film surface preferably constitutes characteristic signs and/or symbols.

A release layer is applied over the full area of the primer layer and/or to the free surface regions of the film used, for the production of the adhesive tapes of the invention. Examples of suitable release layers for the adhesive tapes of the invention are resin dispersions, acrylate dispersions or, in general, polymer dispersions, and/or solventborne polymer solutions, which exhibit a brittleness and a low adhesion to the backing which is sufficient after drying.

Particularly preferred release layers for the adhesive tapes of the invention are appropriate printing inks for backings based on thermoplastic films. For this layer, use is made, for example, of water-based, solvent-based or UV-curing flexographic inks. Ink layers of this kind are strongly colored and suitable for application to the first layer and/or the film by means of a wide variety of technologies. Through an appropriate choice of the printing inks it is possible to formulate the layer system of the adhesive tapes of the invention in such a way that the layer is very well anchored to the primer layer but exhibits poor adhesion, or a poor bond, with the film regions that have not been coated with the primer layer.

The application rate of the release layer to the backing material and/or the primer layer is preferably from 2 to 18 $g/m^2$. In a further preferred embodiment, the layer application rate of the first layer is from 5 to 11 $g/m^2$.

As adhesive compositions it is possible to use essentially all known adhesive compositions with high bond strength on the adhesion substrate which is to be packaged.

The adhesive composition of the adhesive tape of the invention may comprise an adhesive composition based on solventborne natural-rubber and acrylate adhesive compositions. Preference is given to adhesive compositions based on acrylate dispersions. These adhesive composition technologies are used in the adhesive tape industry.

The application rate of the adhesive composition to the backing material is preferably from 15 to 60 $g/m^2$. In another preferred embodiment, the layer application rate is set at from 20 to 30 $g/m^2$.

The adhesive tapes of the invention are produced in a multistage process. In a first step, one of the surfaces of the thermoplastic film-based backing is coated with the silicone-based release coating. This single-sided coating of the backing is realized using corresponding coating units.

The film surface opposite the release coating is pretreated by corona or flaming if desired.

The primer layer with high affinity for the surface of the thermoplastic film used is applied by means of flexographic printing to the film surface opposite the release coating.

Printing by means of the flexographic process is used, inter alia, in the adhesive tape industry for the individualization of adhesive tapes.

It is carried out using printing forms whose raised parts transfer the first layer. The printing forms are flexible plates made of rubber or photopolymers. Flexographic printing components are highly mobile, both solvent-based and water-based. They dry rapidly, especially in the area of the radiation-curing systems. For the production of the adhesive tapes of the invention, it is preferred to use aqueous flexographic printing components. The selection of the screen roller is guided by the printing material used and by the associated flexographic printing component.

For the production of the adhesive tapes of the invention, the application of the release layer to the primer layer and/or to the open areas on the film surface is achieved by the use of customary methods. Mention may be made in this context of the application of aqueous systems by means of knife coaters or of solventborne systems by means of bar coaters, screen rollers or printing processes.

For the subsequent application of the adhesive composition to the layer, both the bar coater and the knife coating technology are suitable.

Also possible is the application of adhesive composition based on styrene-isoprene-styrene as hot-melt pressure-sensitive adhesive to the release layer by means of known technology, in the context of the production of the adhesive tapes of the invention.

BRIEF DESCRIPTION OF THE DRAWINGS

One particularly advantageous embodiment of the adhesive tape of the invention, and its use and function, is illustrated in more detail on the basis of the figures described below, without wishing thereby to restrict the invention unnecessarily. Of these figures.

PREFERRED EMBODIMENT DETAILS

The preferred embodiment of the invention is depicted as adhesive tape 1, used to secure and/or seal an object such as, for example, a cardboard box 2. The box 2 has top lid flaps 3, 4 which for sealing the box 2 are folded down and meet at the line 6. As is customary, the adhesive tape 1 has been bonded over the line 6 on the top and bottom sides of the box 2 and stuck down at the end faces of the box 2 in order to hold down the lid flaps 3, 4.

In order to gain access to the contents of the box 2 without drawing subsequent attention to the attempted broaching, the adhesive tape 1 must be removed in the region of the line 6 in order to be able to fold the lid flaps 3, 4 up. If the adhesive tape 1 used is a standard commercial adhesive tape, it is impossible following removal of the contents from the box 2 and careful rebonding of the adhesive tape 1 to perceive that the adhesive tape 1 has been detached once already at an earlier stage.

The adhesive tape 1 of the present invention, however, is constructed and produced such that opening and closing in the manner described cannot go unnoticed.

Figure 4:
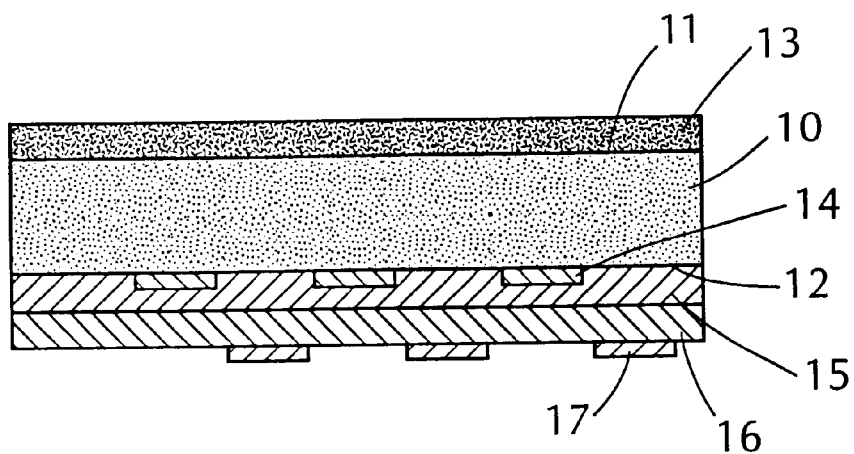
FIG. 4 shows a sectional drawing of the adhesive tape of the invention in its original and bonded form, in which the layer thicknesses are represented so as to permit optimum recognition of the construction and the structure of the adhesive tape.

According to FIG. 4, the adhesive tape 1 comprises a preferably transparent thermoplastic film 10 having a sufficient internal strength which ensures the described utility.

In a first operation, a transparent primer layer 14 is applied, but not over the full area, to the bottom surface 12 of said film 10. The layer 14 is arranged on the film surface 12 in such a that it produces writing which is perceptible on the box surface if the adhesive tape 1 is detached.

In the second step, a release layer 15 is applied to the primer layer 14 and the remaining film surface 12. The release layer 15 comprises a colored material.

The color and its density are selected firstly so that they offer a sufficient color contrast to the standard colors of box materials, so that the writing formed is legible, and secondly such that a company logo or brand identifier present as a print on the adhesive composition layer 16 is able to show through with good perceptibility.

Next, the adhesive composition layer 16, which ensures sufficient bonding security on the box surface, is applied to the release layer 15.

The primer layer 14 adheres relatively strongly to the film surface 12. The release layer 15 adheres only relatively weakly to the film surface 12 but relatively strongly to the primer layer 14.

The adhesion of the release layer 15 to the film surface 12 is lower than the adhesion of the release layer 17 on the adhesive composition layer 16.

Applied to the top face 11 of the film backing 10 is a preferably transparent release layer 13 which adheres relatively strongly to the surface 11. The adhesion of the release layer 13 to the adhesive composition layer 16 is low, so that the adhesive tape 1 wound into a roll may be unwound without separation of the release layer 15 from the film surface 12.

In this process or in a further process, a colored print 17 of a company logo or brand symbol may be applied to the outer surface of the adhesive composition 16.

Figure 1:
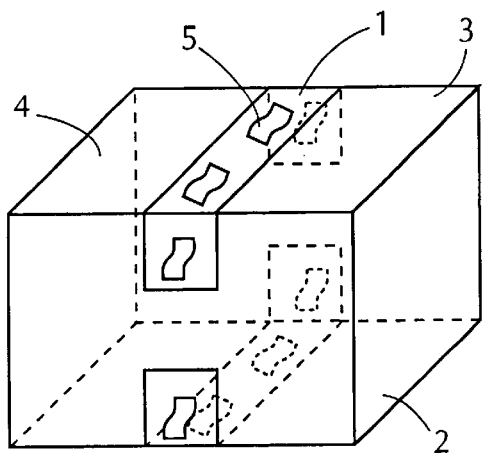
FIG. 1 shows a three-dimensional representation of a cardboard box to which the adhesive tape of the invention is adhered.
Figure 2:
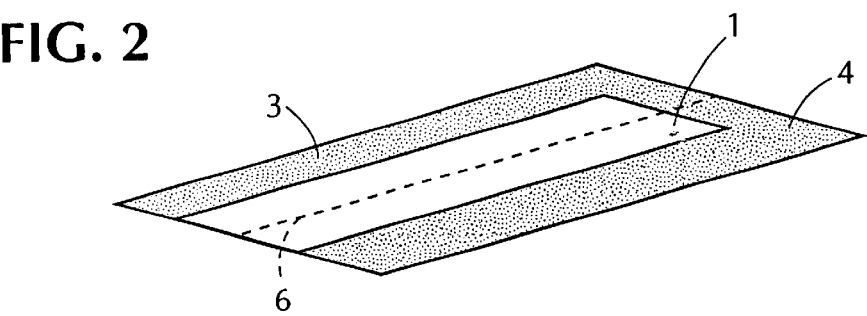
FIG. 2 shows an enlarged section of the representation in FIG. 1 with the adhered adhesive tape.

If the adhesive tape 1 constructed as in FIG. 4 is bonded as shown in FIG. 2 to a surface, the preferred transparency of the release layer 13 and of the film backing 10 and also of the primer layer 14 mean that the uniform color of the ink layer 15 is visible and, if appropriate, the ink layer 17 showing through the adhesive composition layer 16.

Figure 3:
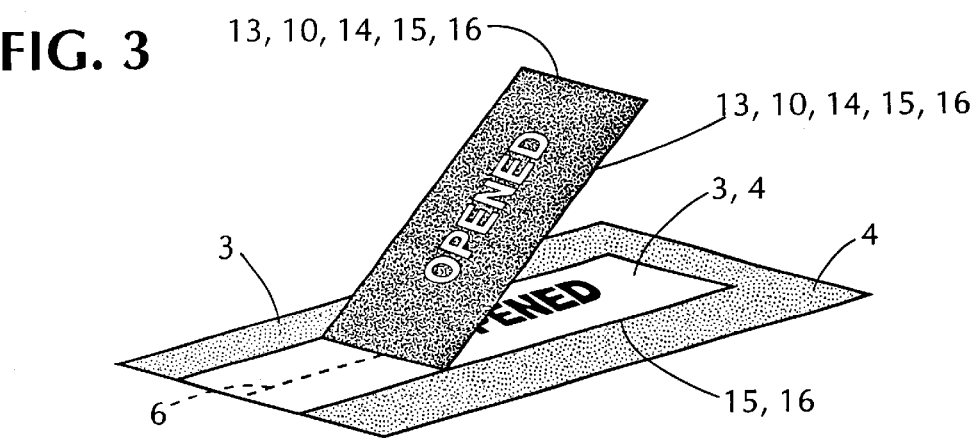
FIG. 3 shows a representation similar to that of FIG. 2, showing the adhesive tape of the invention when it has been partly detached from the surface of the box.
Figure 5:
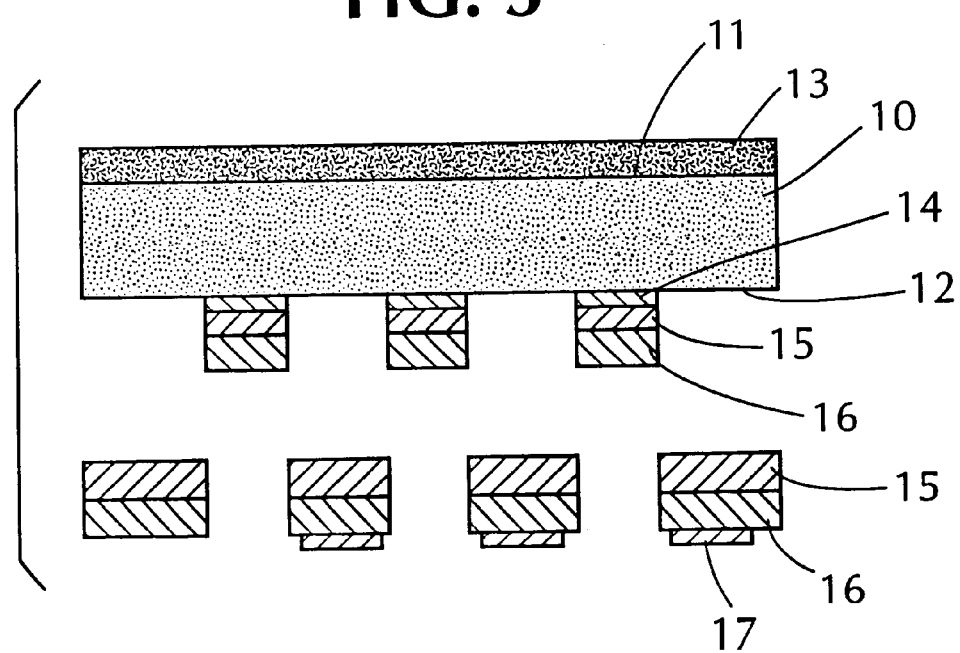
FIG. 5 shows a sectional drawing similar to that of FIG. 4 but showing the proportions of the individual layers when the adhesive tape is first removed from the cardboard box.

When the adhesive tape 1—as shown in FIG. 3—is detached from the box surface, the adhesive tape 1 separates in accordance with FIG. 5. The release layer 15 separates off from the film 10 in the region at which it is in direct contact with the film surface 12, and remains on the box surface 3, 4. In the region where there is the primer layer 14, the adhesive composition layer 16 separates from the box surface 3, 4 and remains on the backing film 10. The word "OPENED" is visible as writing on box surface 3, 4 and as direct colored writing on the backing 10.

When the detached portion of the adhesive tape is replaced, the writing "OPENED" remains visible, since owing to the air layer at the interface between release layer 15 and film surface 12 and an altered light refraction relative to the interface of the primer layer 14 and film surface 12, it forms an optical contrast.

Furthermore, owing to the fact that the backing 10 has deformed during application and detachment, the writing on the backing film 10 can no longer be inserted congruently in the exposed writing on the box surface.

The adhesive tape of the invention is suitable for use as a security closure for clearly evidencing an unauthorized broaching attempt or a broaching for a large number of valuable and/or sensitive goods. An important field of use in this context is the securement of a wide variety of consumer goods against theft, falsification of the contents, and protection against pirate copies. The unnoticed broaching, theft and falsification of sensitive goods is prevented by the use of the adhesive tapes of the invention.

Owing to the ready internal separation of the adhesive tapes of the invention over their full area when the adhesive tape is removed, they are particularly suitable for the broaching securement and/or packaging of easily splittable paper packaging and/or the packaging of kraftliner boxes.

The adhesive tapes of the invention are suitable for a large number of adhesive tape applications. An important field of application is that of packaging applications. The adhesive tapes are suitable for use as carton sealing tapes, general adhesive packaging tapes, strapping tapes, adhesive tapes for sealing plastic packaging and plastic bags. The adhesive tapes are suitable for securing pallets. Further applications are the bundling of loose goods and goods in transit, such as pipes, wooden strips, and the like. The adhesive tapes of the invention may be used to secure refrigerators, for example, and other electrical and electronic appliances during transit. Further applications are in label protection, surface protection, in the construction field, for example, and tear-open strips for packaging. Applications in the office segment are also possible.

Further possible applications include the packaging of medical and pharmaceutical products, the securement of packaging containing cosmetics and bodycare articles, and of foodstuffs and luxury consumables, as a security closure. The securement of electronic and electrical appliances is another possible application.

The intention of the text below is to illustrate the invention with reference to an example, without wishing to restrict the invention unnecessarily.

EXAMPLE a: Film a

A biaxially oriented, coextruded film based on polypropylene from the company Siliconature is used.

| | |
|---|---|
| Film thickness: | 28 μm |
| Identification: | Radil T |
| Company/manufacturer: | Radici |
| Elongation at break: | MD 130% |
| Elongation at break: | CD 50% |
| Modulus of elasticity: | MD 2500 N/mm$^2$ |
| Modulus of elasticity: | CD 4000 N/mm$^2$ |

The surface of the film, which is coated with a primer layer and with a release layer, is corona treated prior to coating with adhesive composition. The surface energy is >42 mN/m.

b: Adhesive Compositions, Primer Layer and Release Layers Used b1: Release Coating A release coating based on a standard 100% silicone system (UV-curing) is used to produce the adhesive tapes of the invention.

b2: Primer Layer

A primer layer based on an aqueous polyurethane dispersion is used to produce the adhesive tapes of the invention.

Identification: NeoRez R560 from Zeneca resins, The Netherlands b3: Release Layer A release layer based on a solventborne printing ink is used to produce the adhesive tapes of the invention.

Identification: 15VAA Druckfarbe from Michael Huber München GmbH, Germany b4: Adhesive Composition:

An adhesive composition based on an aqueous acrylate dispersion is used to produce the adhesive tapes of the invention.

Identification: Primal PS83D from Rohm & Haas, Germany c: Production of the Adhesive Tapes c1: Application of the Release Coating

The coating of the film a with a standard silicone-based release coating takes place by means of the standard technology customary for this purpose.

c2: Application of the Primer Layer:

The coating of the film c1 with the primer layer takes place with the aid of the flexographic printing technique. A flexographic printing plate is used whose raised portions form the word "OPENED".

The laboratory flexographic printing plate and the web speed are adjusted so that after drying a mass application of the primer layer of from about 1 to 3 $g/m^2$ is measured. Coating takes place on a laboratory coating unit with a working width of 500 mm, at a coating rate of 10 m/min. Downstream of the coating station with wire-wound coater bar applicator unit there is a drying tunnel which is operated with hot air (at approximately 100° C.). The coated film was used immediately without a storage period.

c3: Application of the Release Layer

The coating of the film c2 with the release layer is carried out using a wire-wound coater bar. The coater bar and the coating rate are adjusted so that after drying of the coated film a mass application of the release layer of approximately 25 $g/m^2$ is measured. Coating takes place on a pilot-scale coating unit with a working width of 500 mm, at a coating rate of 10 m/min. Downstream of the coating station there is a drying tunnel which is operated with hot air (at approximately 100° C.). The coated film is used immediately without a storage period.

c4: Application of the Adhesive Composition

The coating of the film c3 with the adhesive composition is carried out using a wire-wound coater bar. The coater bar and the coating rate are adjusted so that after drying of the coated film a mass application of approximately 25 $g/m^2$ is measured. Coating takes place on a pilot-scale coating unit with a working width of 500 mm, at a coating rate of 10 m/min. Downstream of the coating station with wire-wound coater bar applicator unit there is a drying tunnel which is operated with hot air (at approximately 100° C.). The coated film was processed in a width of 19 mm. The security effect was determined following storage at 23° C. for two days.

f: Results

To determine the mass application, a circular sample of known area is cut from the coated film and weighed. The adhesive composition is then removed by detachment with acetone and the film, now free of adhesive composition, is reweighed. The mass application in $g/m^2$ is calculated from the difference.

In order to determine the security effect, the adhesive tapes produced in accordance with the example were investigated. To characterize the security effect on cardboard box surfaces, adhesive strips of the adhesive tapes were bonded to cardboard packaging and pressed on using a steel roller weighing 2 kg (which is rolled twice over the bond). The adhesive strip was peeled off by hand, immediately and after a waiting time of 24 hours at 23° C.

| Bond to | Kraftliner box | Recycled box (Testliner box) |
|---|---|---|
| Cardboard box surface | Good | Critical |
| Letter transfer | Very good | Very good |
| Distinct security effect | Yes | Yes |
| Concealed broaching of the box | Not possible | Not possible |
| Packaging security | Very good | Very good |

What is claimed is:

1. A multilayer adhesive tape having a backing based on an oriented thermoplastic film, whose upper face is optionally coated with a release coating and to whose lower face the following layers have been applied:
    a) a primer layer which is not applied over the full area and which anchors very well to the thermoplastic film,
    b) a release layer which is applied over the full area of the applied primer layer, and the free thermoplastic film surface, the release layer anchoring better to the primer layer than to the thermoplastic film,
    c) a pressure-sensitive adhesive composition which is applied over the full area of the release layer and which is anchored better on the release layer than the release layer on the thermoplastic film.

2. The adhesive tape as claimed in claim 1, wherein the thermoplastic film comprises oriented polyolefins or polyester.

3. The adhesive tape according to claim 1, wherein the thermoplastic film is comprised of a member of the group consisting of oriented high-density polyethylene, polyvinyl chloride, polyethylene terephthalate, monoaxially oriented polypropylene and biaxially oriented polypropylene.

4. The adhesive tape according to claim 1, wherein the adhesion of the primer layer to the thermoplastic film and further layers to one another is improved by means of corona treatment or flame treatment.

5. The adhesive tape according to claim 1, wherein the primer layer applied to the film surface constitutes characteristic signs or symbols.

6. The adhesive tape according to claim 1, wherein the release layer comprises one or more members of the group consisting of water-based flexographic printing inks, solvent-based flexographic printing inks, UV-curing flexographic printing inks, resin dispersions, acrylate dispersions, and polymer dispersions.

7. The adhesive tae according to claim 1, wherein the adhesive composition is based on an aqueous acrylate dispersion.

8. The adhesive tape according to claim 1, wherein the adhesive tape is individualized by printing.

9. The adhesive tape according to claim 1, wherein the application rate of the primer layer to the backing material is from 0.5 to 12 $g/m^2$, and the application rate of the first release layer to the primer layer is from 2 to 18 $g/m^2$.

10. A method for providing carton sealing which comprises sealing cartons with the adhesive tape of claim 1.

11. The adhesive tape of claim 6, wherein said release layer comprises water-based, solvent-based, or UV-curing flexographic printing inks.

12. The adhesive tape of claim 8, wherein said adhesive tape is individualized on the adhesive composition side.

13. The adhesive tape of claim 9, wherein the application rate of said primer layer is from 1.5 to 6 $g/m^3$ and the application rate of said first release layer to said primer layer is 5 to 11 $g/m^3$.

* * * * *